US007007497B2

(12) United States Patent
Allard (10) Patent No.: US 7,007,497 B2
(45) Date of Patent: Mar. 7, 2006

(54) MODULAR FREEZE BRANDING DEVICE

(76) Inventor: David P. Allard, 5 Cedar Lake Dr., Butte, MT (US) 59701

( * ) Notice: Subject to any disclaimer, the term of this patent is extended or adjusted under 35 U.S.C. 154(b) by 0 days.

(21) Appl. No.: 10/822,028

(22) Filed: Apr. 8, 2004

(65) Prior Publication Data

US 2005/0011473 A1    Jan. 20, 2005

Related U.S. Application Data

(60) Provisional application No. 60/461,637, filed on Apr. 8, 2003.

(51) Int. Cl.
*F25D 9/00* (2006.01)
(52) U.S. Cl. ..................................................... 62/293
(58) Field of Classification Search ............... 62/293; 101/16, 19, 28, 30, 72
See application file for complete search history.

(56) References Cited

U.S. PATENT DOCUMENTS

| 1,964,455 | A | * | 6/1934 | Cook | 101/28 |
| 2,137,891 | A | * | 11/1938 | Ward | 101/30 |
| 3,358,648 | A | | 12/1967 | Berens et al. | 119/1 |
| 3,411,483 | A | | 11/1968 | Canoy | 119/1 |
| 3,485,060 | A | | 12/1969 | Ziegler | 62/293 |
| 3,515,096 | A | * | 6/1970 | Alex | 606/116 |
| 3,568,464 | A | | 3/1971 | Drayson | 62/293 |
| 3,633,584 | A | * | 1/1972 | Farrel | 606/116 |
| 3,643,303 | A | * | 2/1972 | Kanarek | 29/413 |
| 3,736,937 | A | | 6/1973 | Basiulis | 128/303.1 |
| 4,531,476 | A | * | 7/1985 | Miller | 606/116 |
| 4,787,385 | A | * | 11/1988 | Pfistershammer | 606/25 |
| 4,906,815 | A | * | 3/1990 | Yarrington | 219/233 |
| 5,095,830 | A | * | 3/1992 | Love | 101/28 |
| 5,405,350 | A | | 4/1995 | Baker | 606/116 |

OTHER PUBLICATIONS

Declaration of David P. Allard.
Freeman, D. "Freeze Branding Horses," OSU Extension Facts, F-3986, undated.
Wagner, W. "Freeze Branding for Identification," Extension Service: West Virginia University, dated Jun. 2000.
"Drover's Ay-One Pty Ltd," Web Page Printout from www.drovers.com.au, copy stored and dated as Dec. 2002 by the Internet Archive Project, http:/web.archive.org.
"Wiggins & Associates Inc.," Web Page Printout from www.wigginsinc.com, copy stored and dated as Sep. 2003 by the Internet Archive Project, http://web.archive.org.

* cited by examiner

*Primary Examiner*—William E. Tapolcai
(74) *Attorney, Agent, or Firm*—Edwin X. Suominen; Louis J. Hoffman (57) ABSTRACT

A disclosed modular freeze branding device includes a frame and a number of character assemblies that are configured to be supported by the frame. Each assembly includes a substrate and a section of refrigerant conduit that is coupled to the substrate. The section of conduit has one or more thermally conductive segments arranged along a first side of the substrate to form the shape of a character. Variations and methods are also disclosed.

23 Claims, 6 Drawing Sheets

MODULAR FREEZE BRANDING DEVICE

CROSS REFERENCE TO RELATED APPLICATIONS

This application claims benefit of U.S. Provisional Application No. 60/461,637, filed Apr. 8, 2003, which is incorporated herein by reference.

BACKGROUND OF THE INVENTION

The practice of freeze branding livestock is well defined and understood. Essentially the pigment cells of hair follicles are killed by the cold temperatures incurred during freeze branding. Once the pigment cells are dead, any subsequent hair grown at the freeze-branding site lacks pigment and is therefore white. In this manner, livestock can be permanently marked for individual identification.

During the freeze branding process, application of too low a temperature will kill the hair follicles, and no hair will grow at the branding site. Insufficiently low temperatures at the site will not kill the pigment producing cells entirely or at all, which results in a mixture of white and indigenously colored hair, or no mark at all.

Freeze branding is generally accomplished by using a solution of dry ice and alcohol or a liquid nitrogen bath to cool bronze or copper branding irons. The irons are submerged in the bath until they reach the desired temperature. The brands are then applied to a shaved section of hide meant to be branded. Typical application times are from 20 seconds to one minute. In practice, it is often difficult to assure that the branding irons are cooled to a consistent temperature. Additionally, ambient conditions can have a significant effect on the temperature of the branding irons during the branding process.

It has become a common practice for stock owners to apply individual, multiple digit freeze brands to their livestock. The purpose of this practice is to permanently and uniquely mark livestock for individual identification. It is now apparent that this practice will likely become more popular in light of recent developments relating to BSE (mad cow disease) in the U.S. and the likelihood of a national bovine identification system, as well as the likely implementation of Country of origin labeling (COOL) by the United States Department of Agriculture.

Utilizing known methods, however, it is difficult to apply individual multiple-digit freeze brands to more than 10 head per hour. Accordingly, there is a need for a more expeditious method of applying individual, multiple-digit freeze brands.

U.S. Pat. No. 3,485,060 to Ziegler discloses a livestock branding apparatus constructed such that various branding letters and symbols are interchangeable. The brand symbols, which are made up of a series of finger-like elements having ducts that provide vents for expanding gases caused by evaporating refrigerant, are mounted on individual box structures. The fingers extend a substantial distance into the interior of the box, which defines a plenum chamber for receiving a liquid refrigerant, to provide maximum surface contact with the liquid refrigerant. The fingers are supposedly cooled to a branding temperature by the refrigerant evaporation. Heat conduction through the finger elements is supposed to keep them at a temperature very near that of the vaporizable liquid refrigerant.

A significant drawback to the Ziegler's apparatus is the likely difficulty of changing letters and symbols with its unwieldy refrigerant fluid structure. Ziegler's supposedly interchangeable brand symbols. The refrigerant evaporation that is supposed to cool the fingers to a branding temperature cannot help but also cool the box, which is too small and thin-walled to have much insulation from the surrounding air. Humidity in the surrounding air thus can be expected to form ice on the box during the branding process. With the ice and the extremely cold temperature that the box can be expected to reach, it does not appear at all convenient to detach the box from the sizable surface of contact it makes with Ziegler's tubular support member 24 and manifold 22.

Another significant drawback of Ziegler's apparatus is that the refrigerant spray emitting from the branding fingers' vents can be expected to form a vapor barrier that interferes with thermal conduction between the fingers and the branding subject. In addition, the branding fingers present only a small surface area of contact with the branding subject, an area that is maximized by painfully driving the fingers into the subject's hide. In addition, it is doubtful that the fingers would have enough thermal inertia to remain sufficiently cool to effect a proper freeze brand.

U.S. Pat. No. 3,358,648 to Berens discloses a freeze branding apparatus in which heat-conductive tubing is bent or otherwise fashioned into the shape of brand insignia that are to be applied. The tubing is connected to a supply of "liquified gas" through flexible heat-insulated tubing and is cooled by passing a cryogenic fluid, i.e., the "liquified gas," through it. The device can include a plurality of differently shaped tubings having portions formed to the shape of different insignia, which can be interchangeably coupled to the flexible tubing with a quick disconnect coupling.

Clearly, however, Berens' apparatus is unsuitable for the simultaneous application of multiple insignia. Using the apparatus to apply multiple-digit freeze brands would require multiple separate applications, which would entail either the labor-intensive task of replacing insignia for each digit or the expense of keeping multiple branding apparatuses on hand for the digits being used. In addition, a great deal of difficulty can be expected in making multiple separate applications of an orderly sequence of branding digits to a branding subject that is living, moving, and (especially after the first application) very possibly resistive to the procedure.

Accordingly, the need remains for a way of effectively applying simultaneous branding digits to a subject while permitting convenient changing of the digits to be applied.

SUMMARY OF THE INVENTION

A modular freeze branding device according to various aspects of the present invention includes a frame and a number of branding character assemblies that are configured to be supported by the frame. Each character assembly includes a substrate and a section of refrigerant conduit having one or more thermally conductive segments. The segments are arranged along one side (i.e., face) of the block to form the shape of a character.

The refrigerant conduit has terminations which, according to one advantageous aspect of the invention, extend from another side of the block for convenient access and away from the thermally conductive segments used for branding. A connector can be coupled to one (or more) of the terminations of the section, e.g., to couple with a hose supplying refrigerant.

According to another advantageous aspect of the invention, a plurality of springs elastically couple the section of refrigerant conduit of each character assembly to the assembly's substrate. By permitting the conduit section to "float" above the substrate, such an arrangement facilitates pressing of the conduit's thermally conductive segments against a branding subject with uniform pressure in relationship to branding elements of other character assemblies.

In a method of the invention for freeze branding livestock, refrigerant is caused to flow (e.g., by pressure differential) through a first thermally conductive conduit having exposed, coplanar segments that are arranged in the shape of a set of characters. Then the exposed portions are applied to brand a specimen of livestock, after which the flow of refrigerant is stopped. The above acts are then repeated one or more times with different sets of thermally conductive conduit. The conduit of the different sets have exposed segments that form different sets of characters. Advantageously, an operator can employ the method to efficiently apply individual, multiple-digit freeze brands to each of a number of specimens of livestock.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

DESCRIPTION OF PREFERRED EXEMPLARY EMBODIMENTS

A modular freeze branding device according to various aspects of the present invention provides numerous benefits, including the ability to quickly install, cool, and apply a selected set of freeze-branded markings on a specimen of livestock. For example, device 100 of FIG. 1 includes branding character assemblies 24 that conveniently install into a frame 20. Device 100 further includes two D-handles 22, a manifold brace 46, and an inlet supply system 120.

Figure 2:
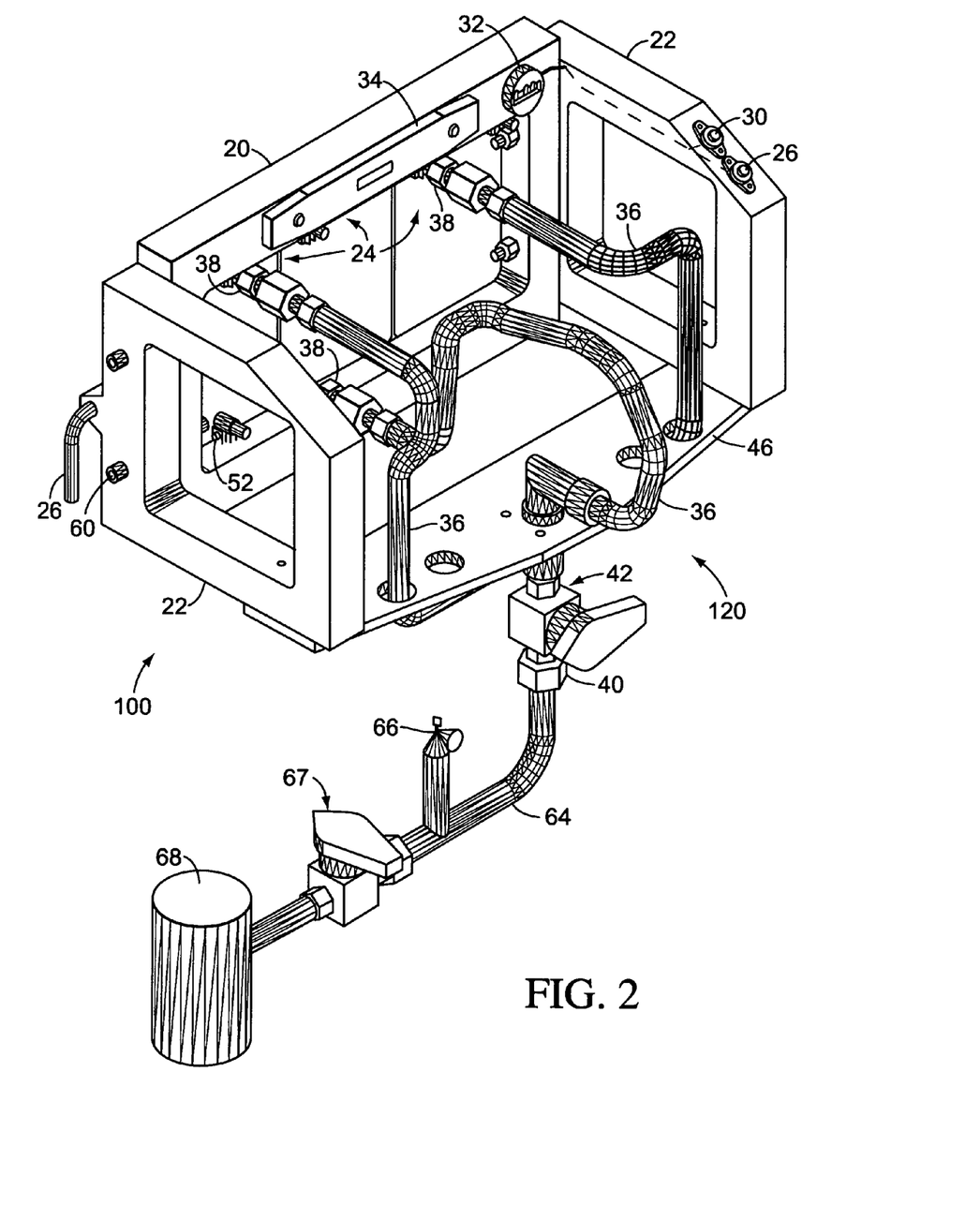
FIG. 2 is a perspective rear right-side view of the freeze branding device of FIG. 1.
Figure 3:
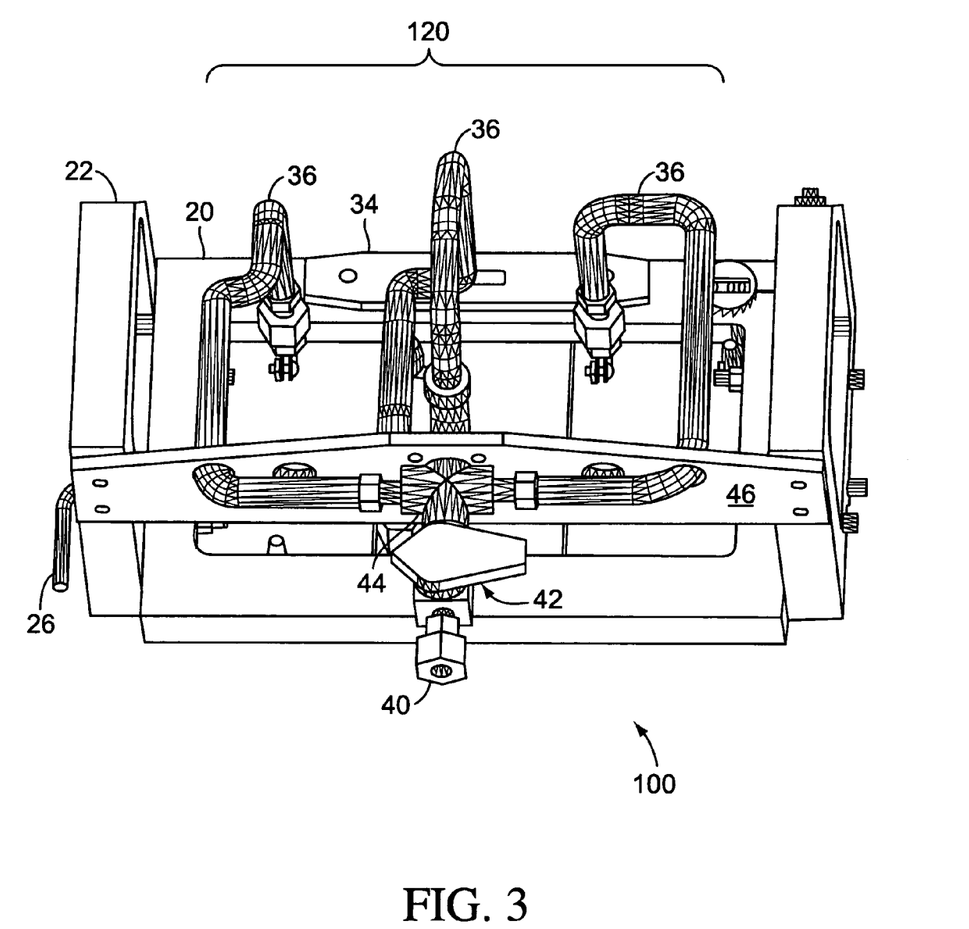
FIG. 3 is a perspective lower-rear view of the freeze branding device of FIG. 1.

As may be better understood with reference to the lower-rear view of FIG. 3, inlet supply system 120 includes a refrigerant inlet connection 40, which threads into an inlet supply valve 42, a distribution manifold 44 connected to valve 42, and three inlet hoses 36 (one for each of the three character assemblies 24, as illustrated in FIG. 2) that thread into manifold 44. Inlet hoses 36 have opposite terminations that connect to an inlet tube connector 38 (FIG. 2) of each character assembly 24.

Figure 1:
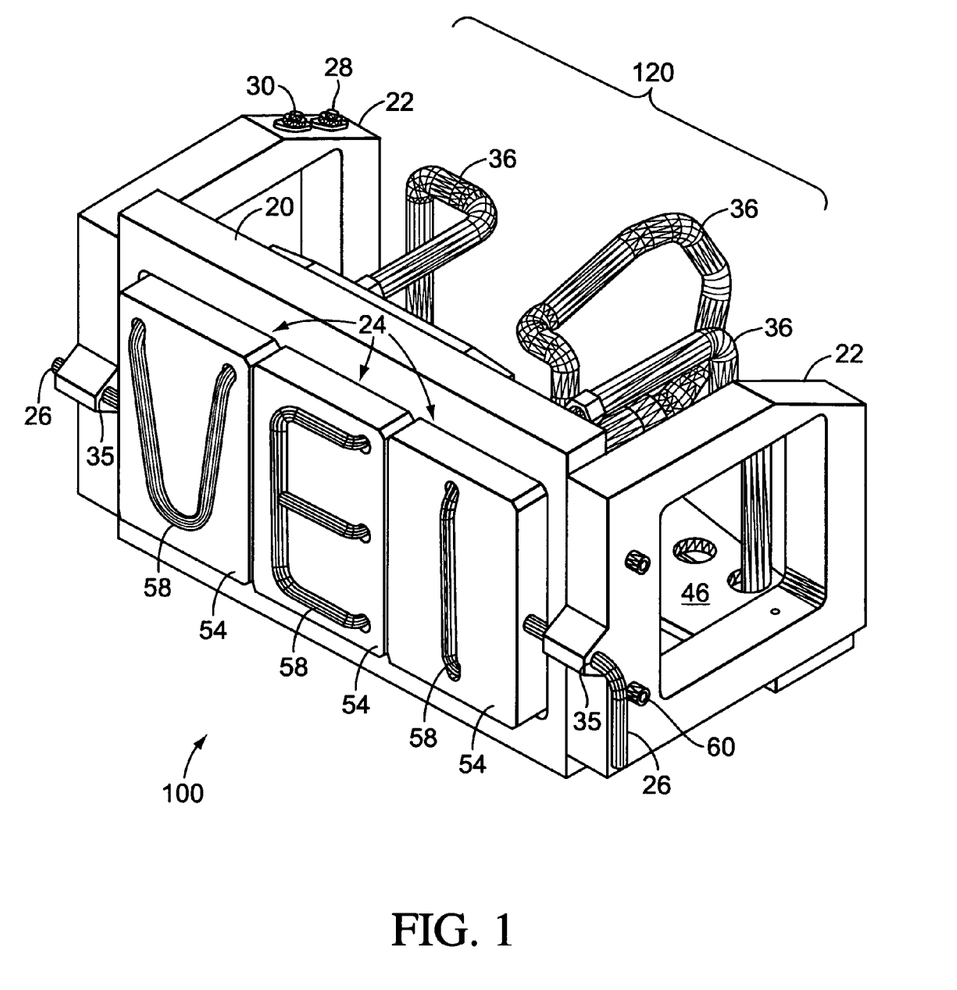
FIG. 1 is a perspective front right-side view of a freeze branding device constructed in accordance with the invention.
Figure 4:
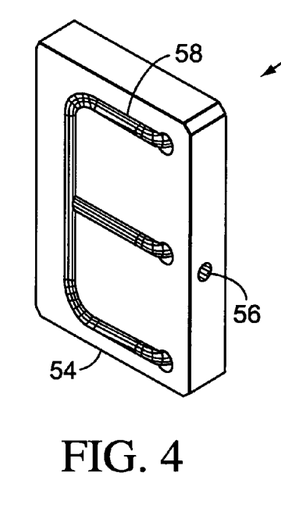
FIG. 4 is a perspective right-side view of a branding character assembly of the freeze branding device of FIG. 1 primarily illustrating a substrate.
Figure 5:
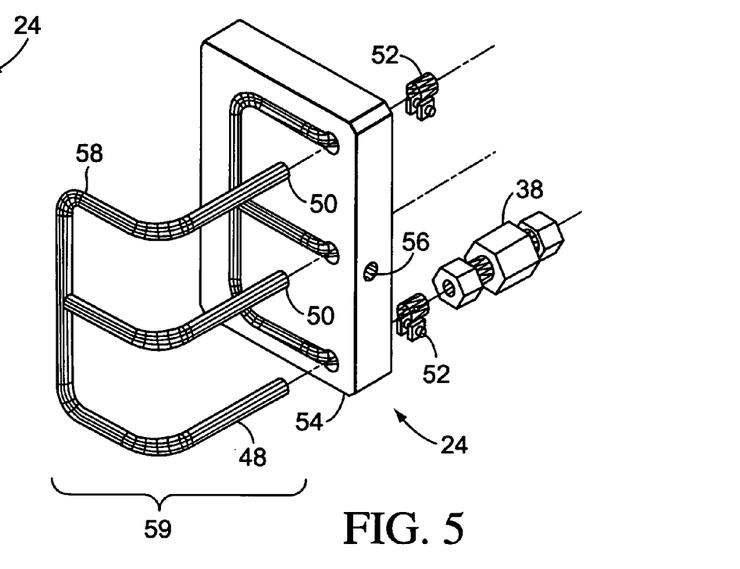
FIG. 5 is an exploded view of the character assembly of FIG. 4.
Figure 6:
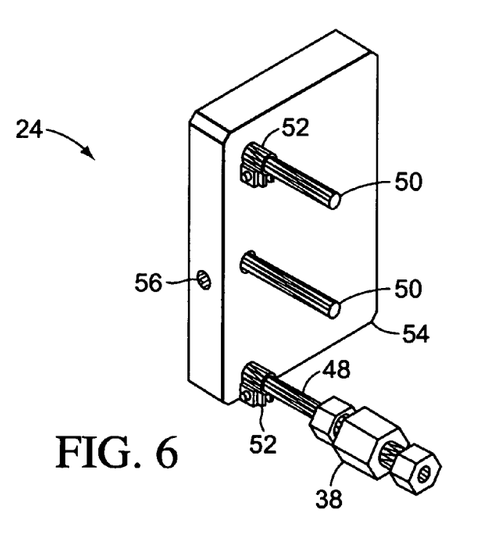
FIG. 6 is a perspective rear view of the character assembly of FIGS. 4–5 primarily illustrating inlet and outlet connections extending from a rear side of the substrate.
Figure 7:
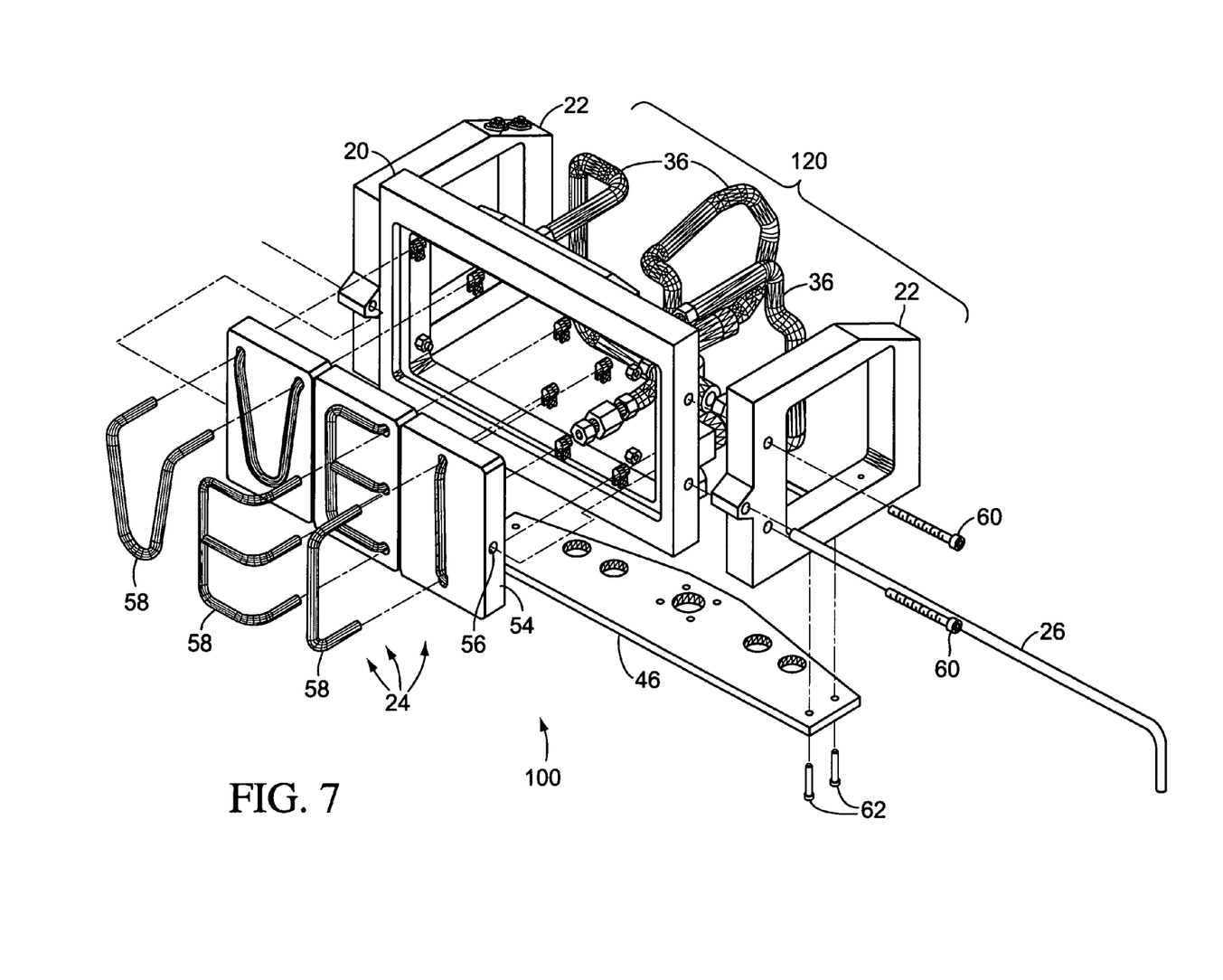
FIG. 7 is an exploded view of the freeze branding device of FIG. 1.

As illustrated in FIGS. 4–6, each character assembly 24 includes a substrate 54 (which could be called a "backing block") and a length of refrigerant conduit 59 (FIG. 5), which can be comprised of any type of conduit suitable for containing a flow of refrigerant, e.g., copper tubing. Substrate 54 is capable of being supported by frame 20 (FIG. 7). Refrigerant conduit 59 includes exposed segments of thermally conductive conduit that serve as a branding element 58, an inlet tube 48, and one or more outlet tubes 50. Assembly 24 further includes an inlet tube connector 38. (The arrangement of exemplary assembly 24 with inlet tube 48 on bottom and outlet tubes 50 on top can be reversed, if desired.) As illustrated in FIG. 1, the exposed segments 58 of refrigerant conduit 59 for each assembly 24 are coplanar.

Substrate 54 has a retention hole 56 through which a retention rod can pass to secure it in place. Exemplary branding elements 58 of character assemblies 24, which are constructed of ¼-inch diameter copper tube, form characters (in this example, characters of the alphabet) that are 3 inches in height by 2 inches in width.

Substrate 54 is machined from a cryogenically compatible material such as UHMW polyethylene. If recessed seating of branding element 58 is desired, a recess can be machined into the face of the substrate 54 in the same configuration as branding element 58 that it supports. The perimeter surfaces of substrate 54 are preferably machined to fit closely into the recess of frame 20 (FIG. 7) and are thus configured to be snugly supported by frame 20.

The exposed segments of refrigerant conduit 59 making up branding element 58 are fabricated of a thermally conductive conduit, such as a copper tube, generally with a combination of bending, manufactured fittings, "saddle" or miter-cut joints. Joint-to-joint connections can be brazed. The connections should be able to withstand the thermal cycling exposure that is encountered during system operation.

A uniformity of refrigerant flow through branding element 58 is important for good branding results. The layout of branding element 58 should be such that refrigerant is evenly distributed along the internal surface of the conduit portion in contact with the area to be branded. However, flow alteration of branding element 58 and consequent change in heat exchange characteristics can be accomplished by restricting or redirecting refrigerant flow in specific sections of the element. In addition, the heat exchange characteristics of branding element 58 can be modified by changes in conduit cross-section, wall thickness or materials of construction. For example, branding element 58 can have a square cross-section, which gives the exposed segments more contact surface area than with a round cross-section.

As illustrated in FIG. 6, inlet tube 48 connects to branding element 58 on a side of substrate 54 opposite the side against which branding element 58 rests. Inlet tube connector 38 is a fitting that allows hose 36 of inlet supply system 120 to be readily connected to and disconnected from inlet tube 48. Compression fittings or flare fittings have been used satisfactorily for inlet tube connector 38. Alternatively, a friction-fit connection can be made between inlet tube 48 and a close-fitting female connector having an inside diameter only about 0.001–0.003 inch larger than the outside diameter of inlet tube 48.

Inlet tube 48 is fabricated from a tube of appropriate size, generally ¼-inch in diameter. Inlet tube 48 and outlet tube 50 can connect to branding element 58 by a compression fitting, brazing, or unitary construction to form the length of refrigerant conduit 59 (FIG. 5). The connection between branding element 58 and inlet tube 48 should be able to withstand the thermal cycling incurred during operation. Outlet tube 50 connects to branding element 58 by the same method as inlet tube 48.

Frame 20, D-handles 22 and manifold brace 46 are all machined out of a cryogenically compatible material such as UHMW polyethylene. As illustrated in FIG. 2, frame 20 has a center section that is vacant to provide clearance for character assemblies 24 with their respective inlet tubes 48 and outlet tubes 50. Substrates 54 of assemblies 24 fit into a recess machined into the front portion of the frame 20, which supports and aligns assemblies 24. A retention rod 26, generally constructed of ¼-inch metal rod, runs through frame retention holes 35 at opposite ends of frame 20. Exemplary frame 20 accommodates three character assemblies 24, although variations can be fabricated to accommodate any reasonable number of such assemblies.

As may be better understood with reference to the exploded view of FIG. 7, D-handles 22 connect to frame 20 by machine screws 60. Manifold brace 46 connects to a lower section of D-handles 22 by screws 62. Manifold brace 46 serves as both an attachment location for distribution manifold 44 (FIG. 3) and a rear brace for D-handles 22. character assemblies 24, three of which are included in device 100, are held in place by retention rod 26, which passes through frame retention holes 35 and respective retention hole 56 of each character assembly 24 (FIGS. 4–6). Each retention hole 56 passes completely through its respective substrate 54 in a location that lines up with retention holes 35 of frame 20 when character assembly 24 is placed in the recess of frame 20. Retention rod 26 slides through frame retention holes 35 and substrate retention hole 56, thereby anchoring the character assembly to the frame 20. In this manner, character assemblies 24 are held in close and uniform alignment.

As illustrated in FIG. 2, exemplary device 100 further includes a timer display 32 that connects to a timer start 28 and timer stop or reset button 30. Timer start button 28 and timer stop (or reset) buttons 30 are located for easy access by an operator during the branding process. Device 100 further includes a frame level 34, which connects to frame 20 in a convenient location. Refrigerant is supplied to device 100 from a refrigerant tank 68. A refrigerant tank valve 70 is used to isolate a refrigerant supply hose 64 and inlet supply valve 42. A pressure relief valve 66 protects refrigerant supply hose 64 from overpressure.

In operation of device 100, liquid nitrogen from a commercially available pressurized Dewar vessel, acting as tank 68, is preferably employed as a refrigerant. The Dewar pressure should be sufficiently above atmospheric pressure to provide a sufficient flow of refrigerant (liquid nitrogen) through the entire branding apparatus. A suitable refrigerant supply hose 64 is used to fluidly connect tank 68 to refrigerant inlet connection 40 of device 100. Inlet supply valve 42 closes and a Dewar liquid nitrogen supply valve 67, which selectably isolates or connects tank 68, opens. A pressure relief valve 66 protects hose 64 from overpressure. A set of selected character assemblies 24 are fitted into branding frame 20 (FIG. 7) and retained by retention rod 26. Character assembly inlet hoses 36 (FIG. 2) are fitted to the inlet tube connector 38 on each assembly 24.

When inlet supply valve 42 opens, liquid nitrogen (not shown) flows from tank 68 to distribution manifold 44 via differential pressure. The liquid nitrogen continues from distribution manifold 44 to inlet hoses 36, and then into branding elements 58. The system is allowed to pre-cool to a consistent temperature. Faces of exposed portions of branding elements 58 (FIG. 1) are applied to a prepared area of the specimen to be branded (not shown). Care should be taken to assure that even pressure of each branding element 58 is applied to the specimen.

Figure 8:
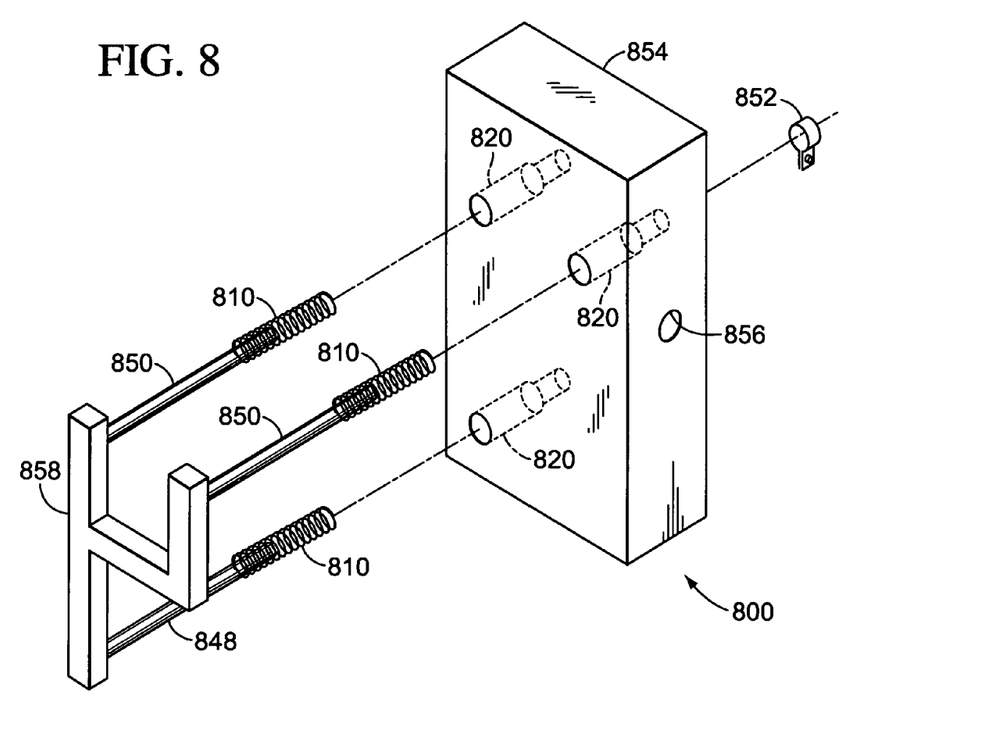
FIG. 8 is an exploded perspective view of a branding character assembly constructed with branding element seating springs according to a particular aspect of the invention.

A variant branding character assembly 800 illustrated in FIG. 8 advantageously facilitates even pressure application. Assembly 800 includes a substrate 854 and a branding element 858 with exposed portions arranged to form the shape of the numeral character "four." Assembly 800 further includes an inlet tube 848 and a pair of outlet tubes 850 that all fluidly connect to branding elements 858, passing through block 854 and springs 810.

Springs 810 fits over inlet tube 848 and outlet tubes 850, and seat in respective spring recesses 820 of block 854. Clamp 852 (one of which is shown) fit around inlet tube 848 and outlet tubes 850 to retain branding element 858 to substrate 854 and provide a desired amount of tension on spring 810. In operation, branding element 858 can press against the branding subject with uniform pressure in relationship to branding elements of other character assemblies (not shown) being applied simultaneously. Branding element 858 "floats" on springs 810, retained laterally by the inlet and outlet tubes, and is thus elastically coupled to block 854. To keep it firmly in frame 20 (FIG. 7), block 854 can include a retention hole 856 comparable to retention holes 56 of block 54 (FIGS. 4–6).

In operation of device 100, a user (not shown) can apply branding elements 58 in correct horizontal alignment with aid from frame level 34. In addition, the operator can depress timer start button 28 upon application of branding elements 58 and thus start timer display 32. The operator should hold device 100 and even contact with the specimen to be branded for an appropriate exposure time, which can be indicated by timer display 32.

Once the operator removes device 100, he or she shuts inlet supply valve 42. The operator can reset timer display 32 with timer stop or reset button 30. A new set of branding characters can then be fitted to the apparatus in preparation for the next specimen to be branded.

During a branding method of the invention, employing device 100 for example, branding elements 58 are continuously cooled by the flow of liquid nitrogen. Liquid nitrogen exits device 100 through outlet tube 50 of each character assembly and discharges to the atmosphere. In a variation (not shown), outlet tubes 50 are configured to recycle the exiting refrigerant to refrigerant tank 68 or some other point of use.

Even though it is well accepted that freeze branding results in less pain and stress to the branding subject than heat branding, the subjects often vigorously resist the process. It is a common occurrence for the operator applying the freeze brands to be forced to prematurely remove the freeze branding device due to vigorous movement by the branding subject. Accordingly, device 100 should be extremely robust in design and construction and, for completion of an interrupted branding process, should facilitate precise re-alignment of its branding elements with a partially completed freeze brand on the hide.

The actual branding site on the branding subject is very unlikely to be entirely flat, so care should be used to assure that the each of the characters to be branded are applied with uniform and consistent pressure. Along with application time, application pressure is one of the major variables that should be controlled for desirable freeze branding results.

As is evident from the discussion above, the modular design of device 100 allows for quick and efficient changing of brand characters. Because the characters are continuously cooled during the branding process, they need not be held in contact with the skin for as long as with conventional methods. As such, it is possible to apply individual multiple-digit freeze brands at rates of 25 to 40 head per hour.

For proper operation, various mechanical precautions should be taken in the construction of exemplary device 100. The components of inlet supply system 120 (FIGS. 2–3) should be rated for the correct thermal operating range of the refrigerant used. Inlet tube connector 38 of each character assembly 24 should provide a leak-free connection to inlet hose 36. A standard 45-degree flare fitting has worked satisfactorily for this purpose. Inlet supply valve 42 should be of sufficient flow capacity to provide enough refrigerant to the branding elements being used. Required flow capacity is a function of several variables such as number and size of characters, ambient conditions and refrigerant temperature. For supplying refrigerant conduit 59 (FIG. 5) of exemplary character assemblies 24 with refrigerant, a ¼-inch ball valve has been shown to be sufficient. Distribution manifold 44 should allow for uniform distribution of refrigerant to each character assembly 24. Orifices or obstructions in the manifold can be used to change the refrigerant flow patterns.

Public Notice Regarding the Scope of the Invention and Claims

The description above and the description incorporated by reference from provisional application Ser. No. 60/461,637 are largely directed to preferred exemplary embodiments of the invention. Specificity of language and statements of advantageous performance do not imply any commensurate limitation on the scope of the invention, nor do they require the stated performance. Portions of the application introducing structural and method elements of the various inventions should be understood as including broadening terminology such as "preferably," "in a variation," "in one embodiment" etc.

No one embodiment disclosed herein is essential to the practice of another unless indicated as such. Indeed, the invention, as supported by the disclosure above, includes all systems and methods that can be practiced from all suitable combinations of the various aspects disclosed, and all suitable combinations of the exemplary elements listed. Such combinations have particular advantages, including advantages not specifically recited herein.

Alterations and permutations of the preferred embodiments and methods will become apparent to those skilled in the art upon a reading of the specification and a study of the drawings. For example, inlet supply system 120 is not limited to supplying three character assemblies as illustrated in FIGS. 1–3, but can be fabricated to supply any reasonable number of branding characters.

Accordingly, none of the disclosure of the preferred embodiments and methods defines or constrains the invention. Rather, the issued claims variously define the invention. Each variation of the invention is limited only by the recited limitations of its respective claim, and equivalents thereof, without limitation by other terms not present in the claim. For example, a claim generically reciting thermally conductive condiuit reads on claims to devices including conduit having a round or square cross section.

In addition, aspects of the invention are particularly pointed out in the claims using terminology that the inventor regards as having its broadest reasonable interpretation; the more specific interpretations of 35 U.S.C. § 112(6) are only intended in those instances where the terms "means" or "steps" are actually recited. For example, the claim term "character," as used with its singular and plural forms in the claims, is not limited to meaning alphanumeric characters such as are illustrated in the drawings. Rather, the term is to be understood in light of its alternate dictionary definitions of "a conventionalized graphic device placed on an object as an indication of ownership, origin, or relationship" and "a graphic symbol (as a letter or number) that represents information." Webster's Ninth New Collegiate Dictionary, Merriam-Webster, 1983.

The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. Both in the claims and in the description above, the conjunction "or" between alternative elements means "and/or," and thus does not imply that the elements are mutually exclusive unless context or a specific statement indicates otherwise.

What is claimed is:

1. Apparatus comprising:
   (a) a frame; and
   (b) a plurality of character assemblies that each include:
      (1) a substrate configured to fit in the frame; and
      (2) a section of refrigerant conduit coupled to the substrate and having one or more thermally conductive segments arranged along a first side of the substrate to form the shape of a character;
      (3) wherein the section of refrigerant conduit has a plurality of terminations extending from a second side of the substrate.

2. The apparatus of claim 1 further comprising, for each section of refrigerant conduit, a connector coupled to one of the terminations of the section.

3. The apparatus of claim 1 wherein, for each section of refrigerant conduit, the character is a letter of the alphabet.

4. The apparatus of claim 1 wherein the frame and the substrate of each one of the character assemblies are comprised of UHMW polyethylene.

5. The apparatus of claim 1 further comprising, for each section of refrigerant conduit, an inlet connector and an outlet connector connected to the section.

6. The apparatus of claim 1 further comprising:
   (a) a tank containing a quantity of refrigerant; and
   (b) a manifold fluidly coupled to the tank and having a plurality of outlets;
   (c) wherein each of the manifold outlets is fluidly coupled to one of the terminations of a respective one of the character assemblies.

7. The apparatus of claim 6 wherein the manifold is supported by the frame.

8. The apparatus of claim 6 further comprising, for each section of refrigerant conduit:
   (a) a hose extending to the section from the manifold; and
   (b) a connector coupled to the hose and to one of the terminations of the section.

9. The apparatus of claim 8 wherein:
   (a) the manifold is supported by the frame;
   (b) the frame and the block of each one of the character assemblies are comprised of UHMW polyethylene; and
   (c) the section of refrigerant conduit of each one of the character assemblies is comprised of copper tubing.

10. Apparatus comprising:
   (a) a frame; and
   (b) a plurality of character assemblies that each include:
   (c) a substrate configured to fit in the frame;

(d) a section of refrigerant conduit coupled to the substrate and having one or more thermally conductive segments arranged along a first side of the substrate to form the shape of a character; and (e) a plurality of springs elastically coupling the section of refrigerant conduit to the substrate.

11. The apparatus of claim 10 wherein the conduit has a square cross section.

12. The apparatus of claim 10 wherein, for each section of refrigerant conduit, the character is a numeral digit.

13. The apparatus of claim 10 wherein the frame and the substrate of each one of the character assemblies are comprised of UHMW polyethylene.

14. The apparatus of claim 10 wherein the section of refrigerant conduit has a plurality of terminations extending from a second side of the substrate.

15. The apparatus of claim 14 further comprising, for each section of refrigerant conduit, an inlet connector and an outlet connector connected to the section.

16. The apparatus of claim 14 further comprising:

(a) a tank containing a quantity of refrigerant; and (b) a manifold fluidly coupled to the tank and having a plurality of outlets;

(c) wherein each of the manifold outlets is fluidly coupled to one of the terminations of a respective one of the character assemblies.

17. The apparatus of claim 16 wherein the manifold is supported by the frame.

18. The apparatus of claim 16 further comprising, for each section of refrigerant conduit:

(a) a hose extending to the section from the manifold; and (b) a connector coupled to the hose and to one of the terminations of the section.

19. A method for freeze branding livestock, comprising:

(a) for each one of a set of characters formed from one or more exposed, coplanar segments of a thermally conductive conduit mounted on a substrate, fitting the substrate into a frame;

(b) causing refrigerant to flow through the thermally conductive conduit;

(c) then applying the segments with uniform pressure against the hide of a specimen of livestock to brand the specimen; and (d) then stopping the flow of refrigerant.

20. The method of claim 19 further comprising, after part (d):

(e) replacing the conduit with another thermally conductive conduit having exposed, coplanar segments that form a different set of characters;

(f) causing refrigerant to flow through the replacement conduit;

(g) applying the segments of the replacement conduit with uniform pressure against the hide of a second specimen of livestock to brand the second specimen;

(h) then stopping the flow of refrigerant.

21. The method of claim 20 further comprising repeating parts (e) through (h) a number of additional times, each time replacing the conduit with a replacement conduit having exposed, coplanar segments that form a unique set of characters and applying the segments to individually brand a single specimen of livestock.

22. The method of claim 19 wherein the character shapes formed are letters of the alphabet.

23. The method of claim 19 wherein the frame is comprised of UHMW polyethylene and each one of the character assemblies includes a block comprised of UHMW polyethylene.

\* \* \* \* \*